UNITED STATES PATENT OFFICE.

ADOLPHUS G. MANDEL, OF NEW YORK, N. Y.

IMPROVEMENT IN LUBRICATING COMPOUNDS.

Specification forming part of Letters Patent No. 157,848, dated December 15, 1874; application filed November 13, 1874.

*To all whom it may concern:*

Be it known that I, ADOLPHUS G. MANDEL, of the city, county, and State of New York, have invented a certain new and Improved Lubricating Compound, of which the following is a specification:

This invention consists in a lubricating compound made of mineral-oil, plumbago, flowers of sulphur, and soapstone, to which may be added tallow, rock-salt, and palm-oil, in such a manner that the plumbago and soapstone act as vehicles to distribute the lubricating material, while the flowers of sulphur and the rock-salt act particularly as coolers.

In carrying out my invention, I mix the ingredients in the following proportions: Mineral-oil, four pounds and seven ounces; plumbago, ten ounces; flowers of sulphur, eight ounces; soapstone, four pounds and seven ounces.

It will in some instances be found desirable to increase the body of such compound, and in such to have present a cooling agent; and to provide for such I propose to employ, in connection with the aforesaid ingredients, tallow, palm-oil, and rock-salt, and under such conditions that good results are produced when the proportions are made: Mineral-oil, three pounds; tallow, two pounds; plumbago, four ounces; rock-salt, four ounces; palm-oil, four ounces; flowers of sulphur, two ounces; soapstone, four pounds and two ounces.

In mixing these ingredients together, I heat the mineral-oil slightly, and stir in the soapstone in a finely-pulverized state; then I add the plumbago, also pulverized, and finally the flowers of sulphur, stirring the mass until a homogeneous mixture is produced. If tallow, rock-salt, and palm-oil are used, I melt the tallow; then I add the mineral-oil and palm-oil, and while this mixture is yet hot I stir in the remaining ingredients until a homogeneous mass is produced.

The object of the flowers of sulphur and of the rock-salt is to keep the journals cool; and the soapstone and plumbago also have somewhat the same effect, while they are used particularly as vehicles to distribute the lubricating material uniformly over the journal, and to prevent the journal from coming in direct contact with the box.

What I claim as new, and desire to secure by Letters Patent, is—

A lubricating compound made of mineral-oil, plumbago, flowers of sulphur, and soapstone, with or without the addition of tallow, palm-oil, and rock-salt, substantially as, and about in the proportions, specified.

In testimony that I claim the foregoing I have hereunto set my hand this 4th day of November, 1874.

A. G. MANDEL.

Witnesses:
W. HAUFF,
E. F. KASTENHUBER.